US008762866B2

(12) United States Patent
Moskalonek et al.

(10) Patent No.: US 8,762,866 B2
(45) Date of Patent: Jun. 24, 2014

(54) REMOTE PAINT MIXING CONTROLLER

(75) Inventors: Christoph Moskalonek, San Francisco, CA (US); John Nack, San Jose, CA (US)

(73) Assignee: Adobe Systems Incorporated, San Jose, CA (US)

( * ) Notice: Subject to any disclaimer, the term of this patent is extended or adjusted under 35 U.S.C. 154(b) by 259 days.

(21) Appl. No.: 13/083,362

(22) Filed: Apr. 8, 2011

(65) Prior Publication Data
US 2013/0132905 A1 May 23, 2013

(51) Int. Cl.
*G06F 3/0484* (2013.01)
(52) U.S. Cl.
USPC ............................................. 715/764
(58) Field of Classification Search
CPC .............................. G06F 3/0484; G06F 3/0488
USPC .................................... 715/764, 772, 864
See application file for complete search history.

(56) References Cited

U.S. PATENT DOCUMENTS

| | | | |
|---|---|---|---|
| 7,602,405 B2 * | 10/2009 | Hsu | 345/629 |
| 7,694,806 B2 | 4/2010 | Huggins | |
| 7,747,615 B2 | 6/2010 | Rodrigues et al. | |
| 2003/0161014 A1 * | 8/2003 | Tobita et al. | 358/537 |
| 2006/0084039 A1 | 4/2006 | Ryokai | |
| 2007/0140095 A1 | 6/2007 | Rast | |
| 2008/0291449 A1 | 11/2008 | Rodrigues et al. | |
| 2011/0016406 A1 * | 1/2011 | Grosz et al. | 715/741 |
| 2011/0029601 A1 | 2/2011 | Grosz et al. | |
| 2011/0029884 A1 | 2/2011 | Grosz et al. | |

* cited by examiner

*Primary Examiner* — Thanh Vu
(74) *Attorney, Agent, or Firm* — Wolfe-SBMC

(57) ABSTRACT

A virtual canvas is displayed at a graphical user interface of a touch-enabled device, a virtual canvas. A plurality of color indicia is displayed. A first input that selects a first selected color from the plurality of color indicia is received. A first positional input indicating a first position at which the first selected color is displayed is also received. A second input that selects a second selected color from the plurality of color indicia is received. A second positional input indicating a second position at which the second selected color is displayed is received at the virtual canvas. A mixed color based on first selected color and the second selected color is generated if the first position overlaps the second position. The mixed color is sent from the touch-enabled device to a computing device through a network.

20 Claims, 9 Drawing Sheets
(6 of 9 Drawing Sheet(s) Filed in Color)

REMOTE PAINT MIXING CONTROLLER

BACKGROUND

1. Field

This disclosure generally relates to computing devices. More particularly, the disclosure relates to a remote paint mixing controller.

2. General Background

Graphic artists currently have computer applications that allow them to generate their creative designs. However, a large disconnect still exists between the creative process typically utilized by artists with painting tools such as a paintbrush, palette of colors, and a canvas and the creative process utilized by graphic artists with a desktop computer and a mouse. In other words, the graphic artist cannot typically simulate the full effect of a painter and the painter's tools. For example, even though a computer program can accurately simulate the mixing of colors in color palette, the joy of actually pushing the paint around is lost.

SUMMARY

In one aspect of the disclosure, a computer program product is provided. The computer program product includes a computer useable medium having a computer readable program. The computer readable program when executed on a computer causes the computer to display, at a graphical user interface of a touch-enabled device, a virtual canvas. Further, the computer readable program when executed on the computer causes the computer to display, at the graphical user interface, a plurality of color indicia. In addition, the computer readable program when executed on the computer causes the computer to receive a first input that selects a first selected color from the plurality of color indicia. The computer readable program when executed on the computer causes the computer to receive, at the virtual canvas, a first positional input indicating a first position at which the first selected color is displayed. Further, the computer readable program when executed on the computer causes the computer to receive a second input that selects a second selected color from the plurality of color indicia. In addition, the computer readable program when executed on the computer causes the computer to receive, at the virtual canvas, a second positional input indicating a second position at which the second selected color is displayed. Further, the computer readable program when executed on the computer causes the computer to generate a mixed color based on first selected color and the second selected color if the first position overlaps the second position. In addition, the computer readable program when executed on the computer causes the computer to send the mixed color from the touch-enabled device to a computing device through a network.

In another aspect of the disclosure, a process is provided. The process displays, at a graphical user interface of a touch-enabled device, a virtual canvas. Further, the process displays, at the graphical user interface, a plurality of color indicia. In addition, the process receives a first input that selects a first selected color from the plurality of color indicia. The process also receives, at the virtual canvas, a first positional input indicating a first position at which the first selected color is displayed. Further, the process receives a second input that selects a second selected color from the plurality of color indicia. In addition, the process receives, at the virtual canvas, a second positional input indicating a second position at which the second selected color is displayed. The process also generates a mixed color based on first selected color and the second selected color if the first position overlaps the second position. Further, the process sends the mixed color from the touch-enabled device to a computing device through a network.

In yet another aspect of the disclosure, a system is provided. The system includes a graphical user interface of a touch-enabled device that displays a virtual canvas and a plurality of color indicia. Further, the system includes a reception module that receives (i) a first input that selects a first selected color from the plurality of color indicia, (ii) a first positional input at the virtual canvas indicating a first position at which the first selected color is displayed, (iii) second input that selects a second selected color from the plurality of color indicia, and (iv) a second positional input at the virtual canvas indicating a second position at which the second selected color is displayed. In addition, the system includes a processor that generates a mixed color based on first selected color and the second selected color if the first position overlaps the second position. The system also includes a transmission module that sends the mixed color from the touch-enabled device to a computing device through a network.

BRIEF DESCRIPTION OF THE DRAWINGS

The patent or application file contains at least one drawing executed in color. Copies of this patent or patent application publication with color drawing(s) will be provided by the Office upon request and payment of the necessary fee.

The above-mentioned features of the present disclosure will become more apparent with reference to the following description taken in conjunction with the accompanying drawings wherein like reference numerals denote like elements and in which:

FIG. 3A illustrates the GUI prior to initiation of color mixing.

FIG. 3B illustrates the GUI after initiation of color mixing.

DETAILED DESCRIPTION

A computer program may be stored on a first device, e.g., a tablet device, to mix colors and send the results over a network, e.g., a wireless network, to another computer program stored on another device, e.g., a desktop computer. As an example, the tablet device is turned into a remote mixing surface for the desktop computer's painting program. A user can select a color from the palette by touching the tablet device with a finger and then place the color on a canvas by touching the canvas. The user can then select other colors and then touch a mixed color on the canvas to move a mixed color to a saved location.

Figure 1:
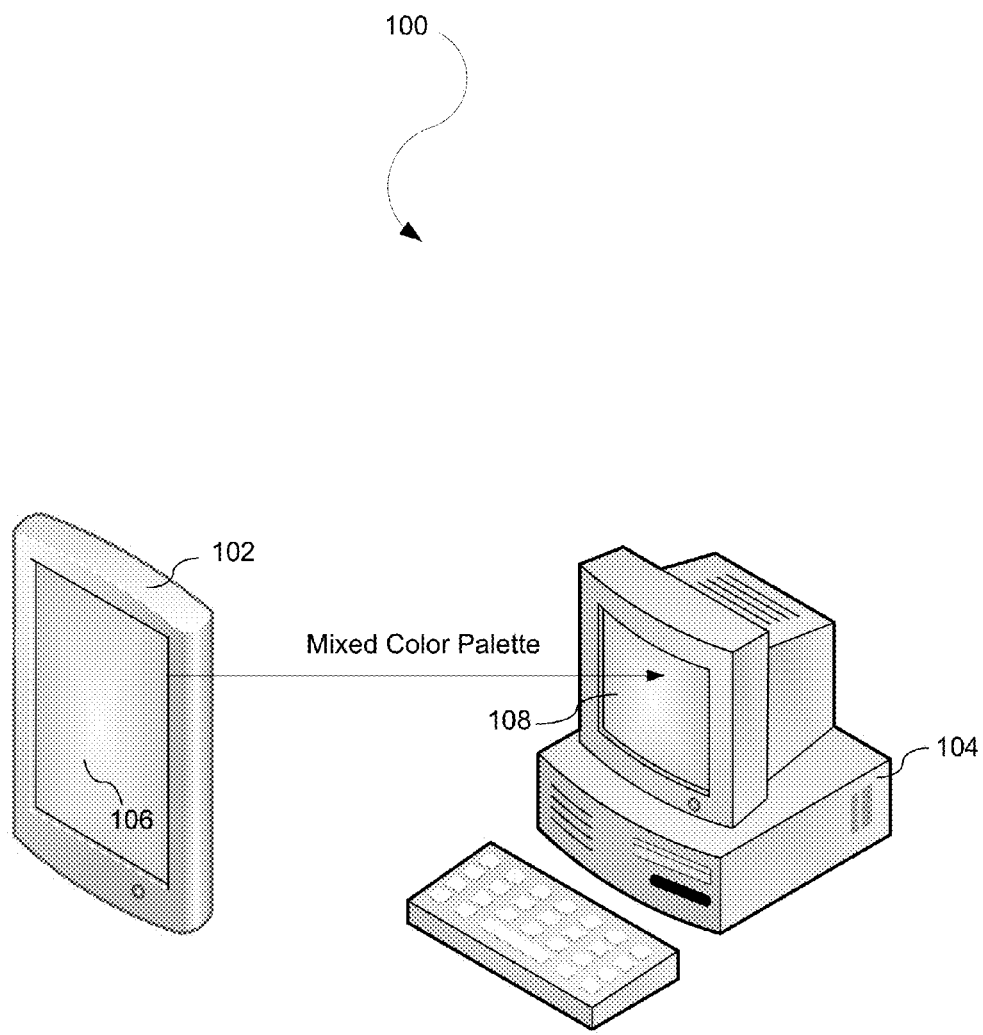
FIG. 1 illustrates a remote mixing system.

FIG. 1 illustrates a remote color mixing system 100. As an example, the remote color mixing system 100 may have a first device 102 such as a touch enabled tablet device and a second device 104 such as a desktop computer. A variety of computing devices may be utilized for either of these devices. For example, the first device may also be a touch enabled cell phone, smart phone, touch enabled laptop, or the like and the second device may also be a set top box, laptop, tablet device, cell phone, smart phone, or the like.

In one embodiment, the first device 102 communicates with the second device 104 through a network. The network may be a wireless network, home network, local area network, wide area network, the Internet, or the like. Alternatively, the network may be connected through a wireline connection. In yet another alternative configuration, the first device 102 may communicate directly with the second device 106 directly through a wireline connection, infrared signals, radio frequency signals, or the like. In one embodiment, a server is utilized to receive data from the first device 102. The server may be a separate device or the second device 104 itself. The first device 102 may have a processor that operates code to establish a network connection with the server. In one embodiment, the second device 104 may open a specific networking port to become a server. The server may advertise itself with a networking configuration. The first device 102 then acts as a client to request a connection with that information by specifying the internet protocol ("IP") address or hostname of the server. After being connected, the server waits for code containing commands, e.g., scripts. The server then sends these commands to the painting program in the second device 104, which evaluates the data. As an example, the first device 102 may send a mixed color or another color to the second device 104 along with a command regarding a request for a change in foreground color. The second device 104 then evaluates the command and sends the command to the painting program so that the painting program may implement change the foreground color to the mixed color other color received from the first device 102. As another example, the command may be a request to change a toolbar color in the painting program stored in the second device 104. A variety of other commands may be utilized.

A user may provide touch inputs to the first device through a first device GUI 106. Further, the user can send data from the first device 102 to the second device 104 so that the data is displayed on a second device GUI 108. As an example, a user may be utilizing a painting program on the second device 104, but may want to have the natural feeling of mixing colors to create a mixed color palette that includes a variety of mixed colors. The user can mix the colors on the first device by providing touch inputs to mix the colors. The user may then send a mixed color palette of those mixed colors to the second device 104 so that the mixed color palette may be utilized with the painting program residing on the second device 104. The mixed color palette may include colors other than the mixed colors. For example, the mixed color palette may also include some pre-generated colors that were generated by code residing on the first device 106 or obtained by the first device 106. Further, the user may choose to provide the entire mixed color palette or only selected colors from the mixed color palette to the second device 104.

In an alternative embodiment, the user may provide inputs on the second device 104 to be sent to the first device 102. As an example, a user may like want to establish certain parameters for the first device 102 by typing inputs for those parameters. Accordingly, data and commands may also be sent from the second device 104 to the first device 102. In that instance, the second device 104 will act as a client and the first device 102 or another intermediary device will act as the server to the second device 104.

In yet another alternative embodiment, both the first device 102 and the second device 104 may send data and provide commands to each other. As an example, the devices may communicate through a peer-to-peer network.

In one embodiment, the remote color mixing system 100 is platform independent. In other words, the first device 102 may send data and commands to the second device 104 independent of the platforms of the first device 102 and the second device 104.

Figure 2:
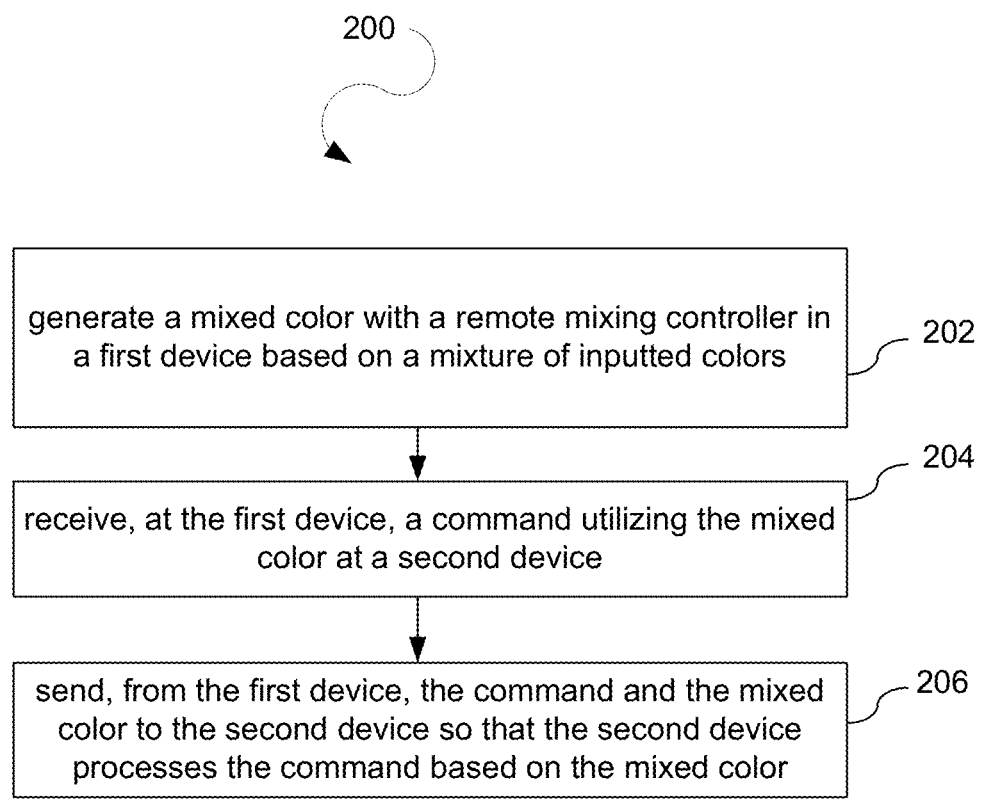
FIG. 2 illustrates a process 200 utilized by the first device to communicate with the second device illustrated in FIG. 1.

FIG. 2 illustrates a process 200 utilized by the first device 102 to communicate with the second device 104 illustrated in FIG. 1. At a process block 202, the process 200 generates a mixed color with a remote mixing controller in the first device 102 based on a mixture of inputted colors. As an example, the user may mix blue and yellow to form a mixed color. Further, at a process block 204, the process 200 receives, at the first device 102, a command utilizing the mixed color at a second device. In addition, at a process block 206, the process 200 sends, from the first device 102, the command and the mixed color to the second device 104 so that the second device 104 processes the command based on the mixed color.

Figure 3A:
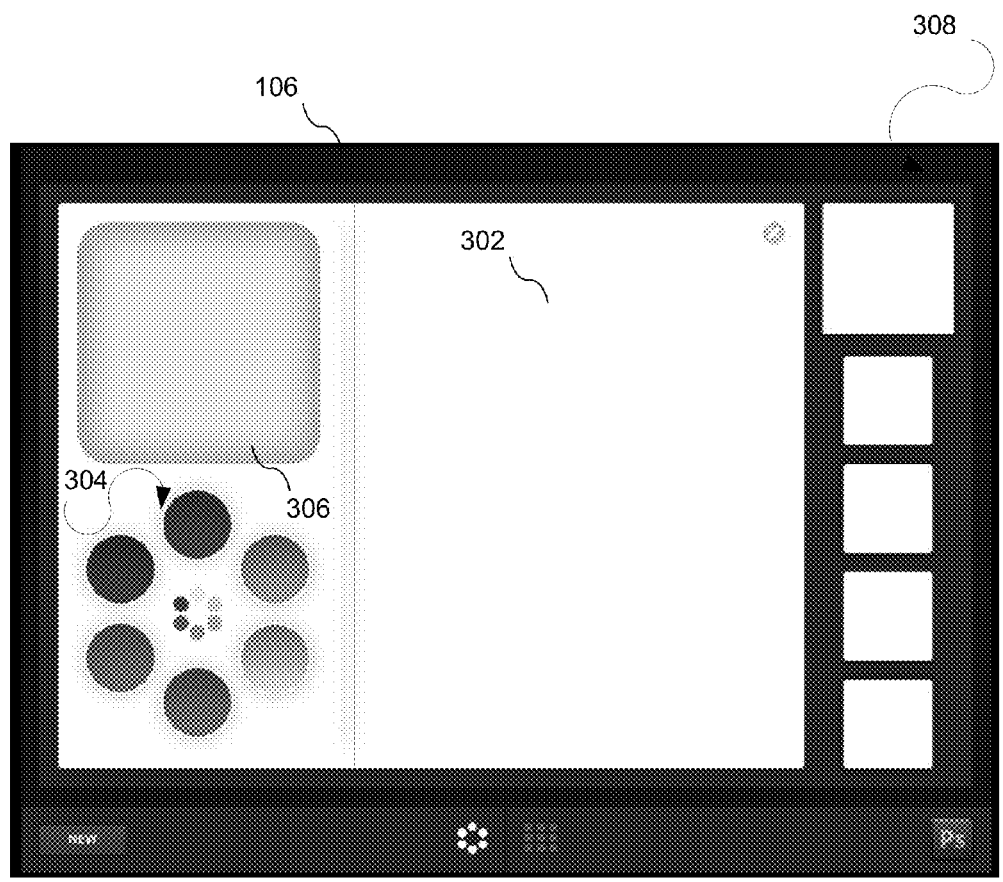
FIGS. 3A and 3B illustrate the graphical user interface ("GUI") of the first device illustrated in FIG. 1.
Figure 3B:
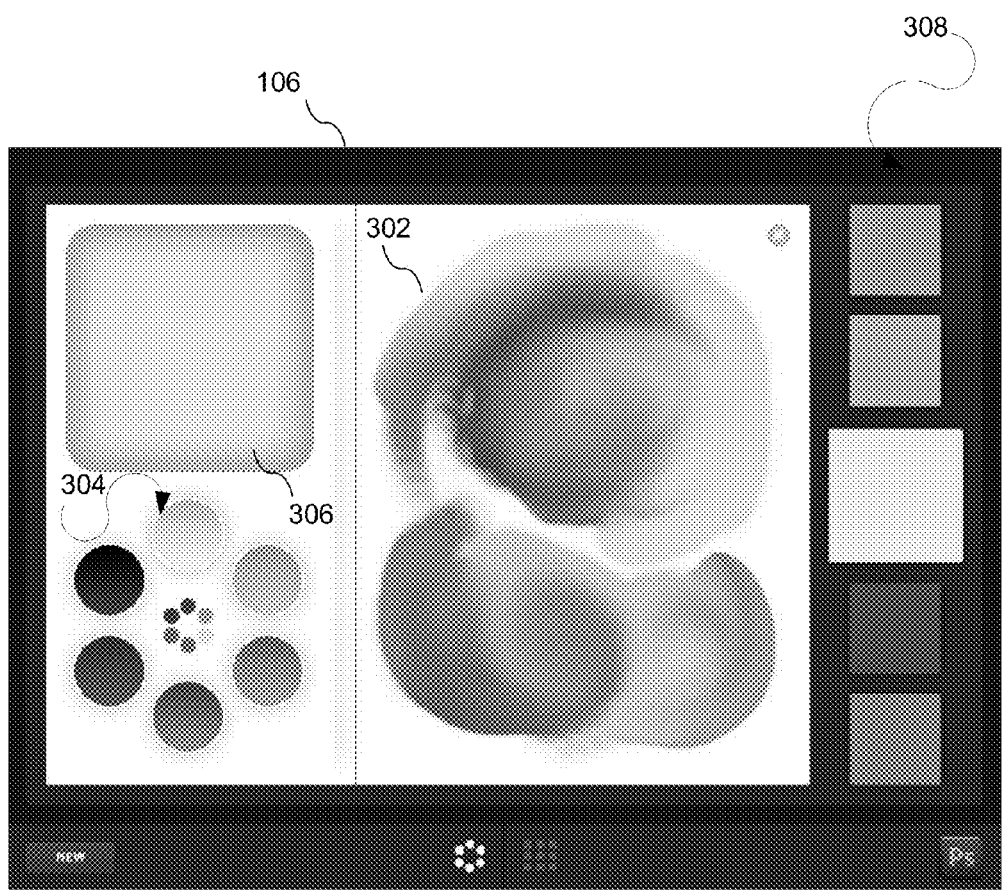

FIGS. 3A and 3B illustrate the GUI 106 of the first device 102 illustrated in FIG. 1. FIG. 3A illustrates the GUI 106 prior to initiation of color mixing. The GUI 106 has a virtual canvas 302 and a plurality of color indicia 304. The plurality of color indicia 304 may be positioned externally to the virtual canvas 302 or within the virtual canvas 302. As an example, the plurality of color indicia 304 may be red, purple blue green, yellow, and orange. A user may select one of these colors by touching the color. The user may then remove his or her finger and touch the virtual canvas 302 with his or her finger. The user may move his or her finger or fingers along the virtual canvas 302 to smear the color. The user may then select a different color by touching a different color in the plurality of color indicia 304. The user may then touch the virtual canvas 302 with his or her finger or fingers with the different color. If the user smears the different color in a location that also has at least some of the initial color, then that overlapped location will display a mixed color of the two colors. In one embodiment, a remote mixing processor performs a mixing calculation to generate the mixed color to be displayed in the overlapped location of the virtual canvas 302. Although two colors are described herein for illustrative purposes, more than two colors may be mixed with any of the configurations described herein.

Further, a user may not want to add any more color to the virtual canvas 302. Accordingly, the user may clean his or her finger of any color by touching a water well 306.

In addition, the user may want to save one or more mixed colors. Accordingly, in one embodiment, the user may touch a storage area selected form a plurality of storage areas 308 to give context of where to store a color. The user may then touch the desired color in the virtual canvas 302 to insert the desired color in the storage area. The user may then later send a saved mixed color from that storage area. In an alternative embodiment, the user may touch a desired color in the virtual canvas 302 and touch a storage area from the plurality of storage areas 308 to store the desired color. The user may also touch a color in a storage area and then touch a color indicium from the plurality of color indicia 304 to change a color indicium. As an example, a user may touch a mixed color saved in the plurality of storage areas 308 and then touch the color red in the plurality of color indicia 304 to remove the color red and insert the mixed color. The user can then use the mixed color with other colors for future mixing.

FIG. 3B illustrates the GUI 106 after initiation of color mixing. A plurality of mixed colors generated from smearing colors is displayed on the virtual canvas 302. Further, as an example, the plurality of color indicia 304 may be virtual ink wells. In other words, each of the plurality of color indicia 304 may be depleted as would an ink well. Accordingly, the user may then refill the virtual ink wells with the same or different colors. Further, the color on the user's finger may lessen and be depleted based on the amount of use by the user. Rings around the virtual ink wells may each represent how much ink is left on the user's finger. In an alternative embodiment, the plurality of color indicia 304 is a plurality of virtual ink wells that are not depleted, but the color on the user's finger may lessen and be depleted based on the amount of use by the user. Rings around the virtual ink wells may each represent how much ink is left on the user's finger. Further, the user has stored some color in the plurality of stored colors 308.

Figure 4:
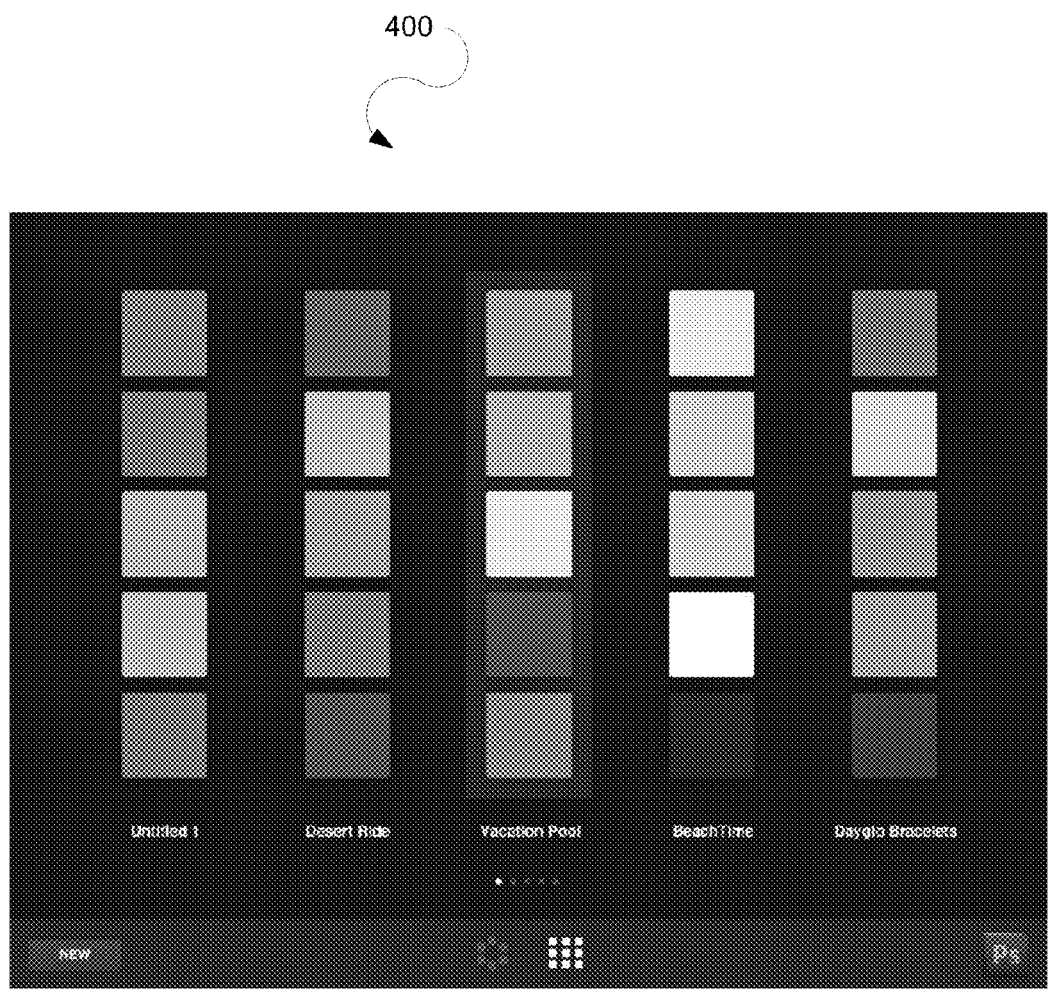
FIG. 4 illustrates a library of color palettes.

FIG. 4 illustrates a library 400 of color palettes. In one embodiment, each color palette includes an assortment of colors selected by a user through touch inputs. Each color palette may include one or more mixed colors generated by the touch inputs from the user or one or more pre-generated colors selected by the user.

Figure 5:
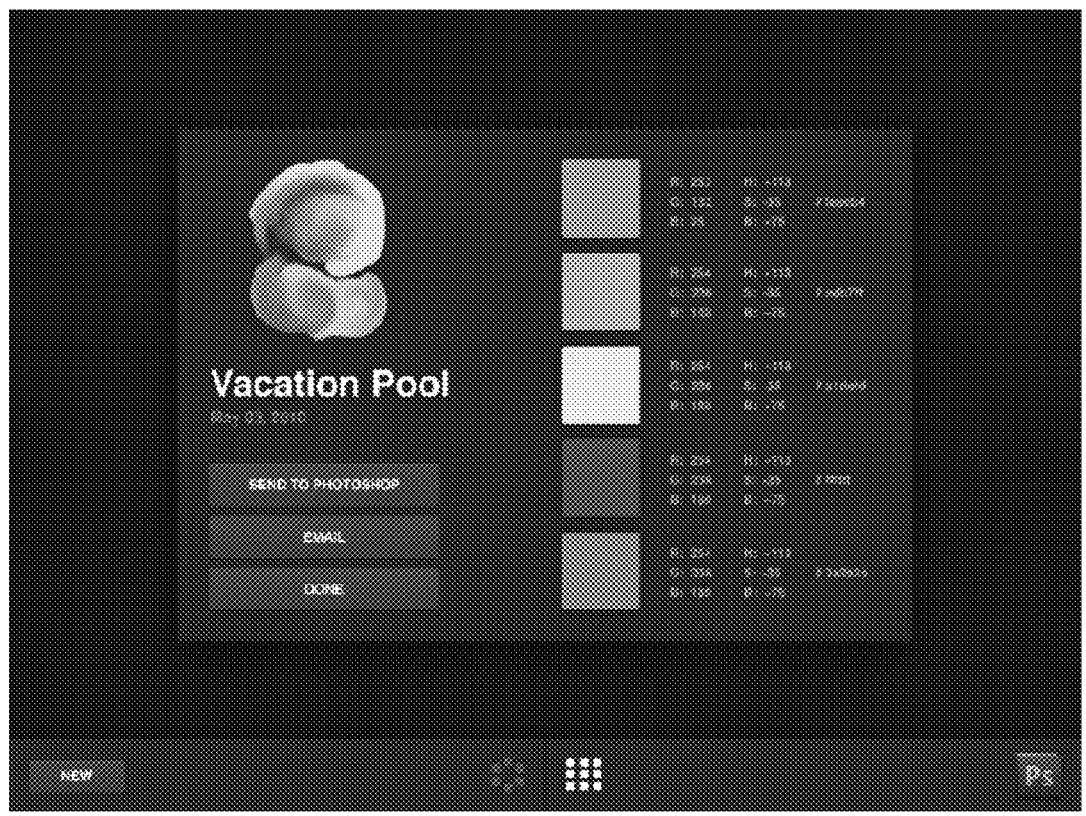
FIG. 5 illustrates a communication menu that may be utilized to send a color palette from the library illustrated in FIG. 4 to another device.

FIG. 5 illustrates a communication menu 500 that may be utilized to send a color palette from the library 400 illustrated in FIG. 4 to another device. As an example, the communication menu 500 allows a user to send a selected color palette to the second device 104 illustrated in FIG. 1 over a wireless network. As another example, the communication menu 500 allows the user to e-mail the selected color palette to an e-mail address. In one embodiment, the smears displayed on the virtual canvas 302 illustrated in FIG. 3B may be sent. Further, details about each color in the color palette may also be sent. For example, red, green, and blue values for each color may be sent. As another example, hue, saturation, and brightness values may be sent. In yet another embodiment, the entire library 400 may be sent. In one embodiment, the library 400 may be an addition or an update to a library stored in the second device 104.

Figure 6:
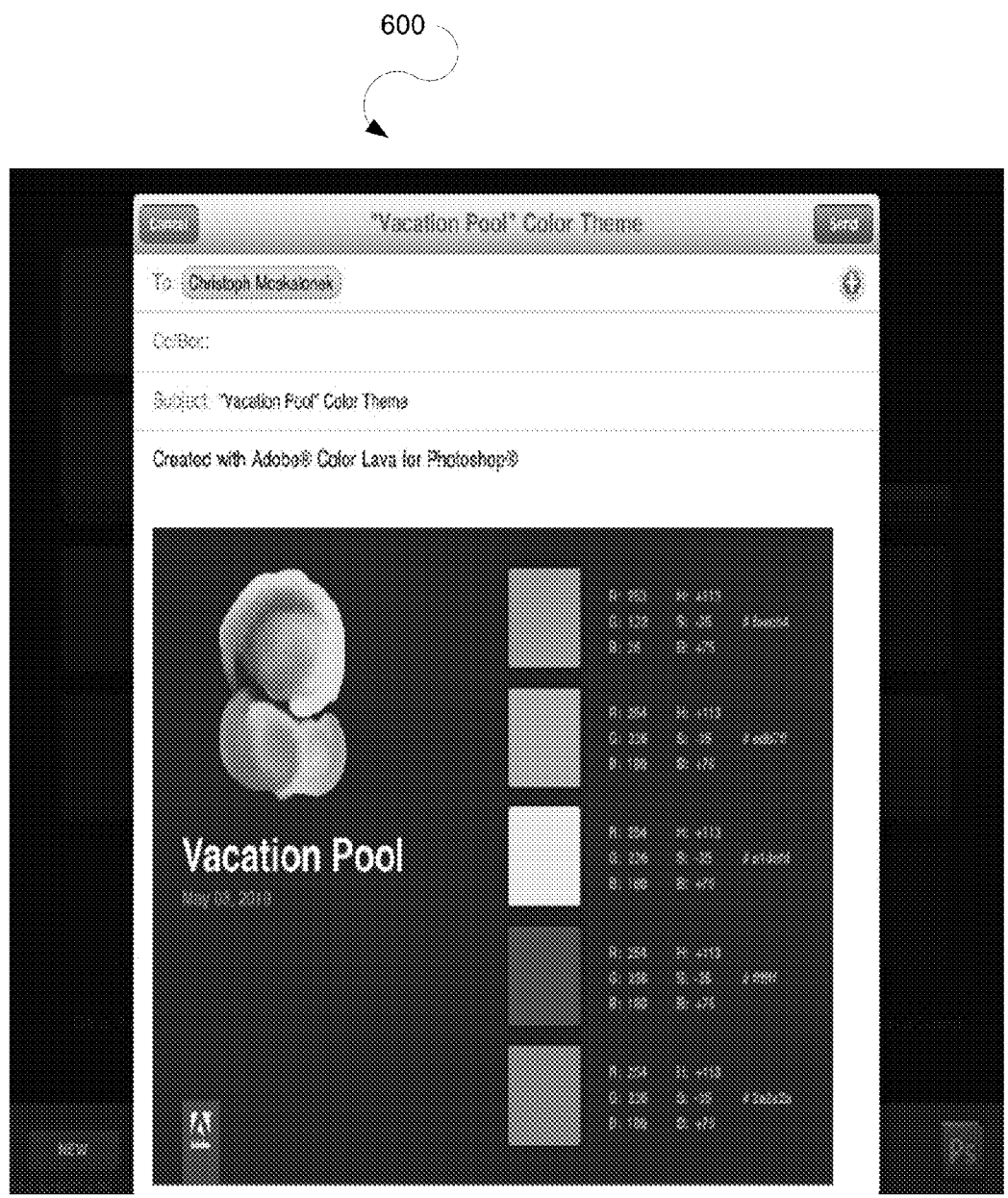
FIG. 6 illustrates an example of an e-mail message.

FIG. 6 illustrates an example of an e-mail message 600. The e-mail message 600 may send the selected color palette subsequent to an e-mail menu selection in FIG. 5.

Figure 7:
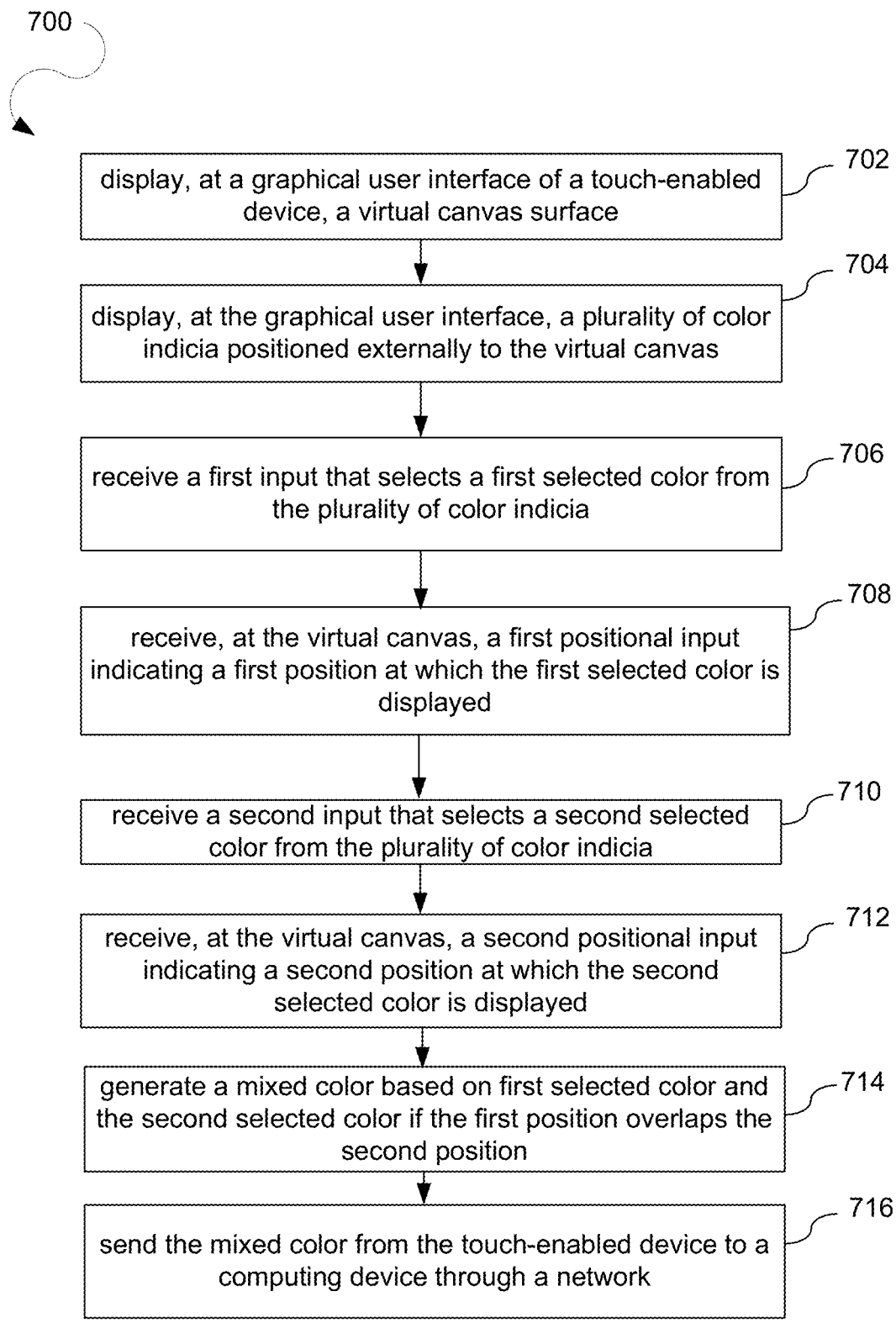
FIG. 7 illustrates a process that may be utilized to provide color mixing on a remote device.

FIG. 7 illustrates a process 700 that may be utilized to provide color mixing on a remote device. At a process block 702, the process 700 displays, at a graphical user interface of a touch-enabled device, a virtual canvas. Further, at a process block 704, the process 700 displays, at the graphical user interface, a plurality of color indicia. In addition, at a process block 706, the process 700 receives a first input that selects a first selected color from the plurality of color indicia. At a process block 708, the process 700 also receives, at the virtual canvas, a first positional input indicating a first position at which the first selected color is displayed. Further, at a process block 710 the process 700 receives a second input that selects a second selected color from the plurality of color indicia. In addition, at a process block 712 the process 700 receives, at the virtual canvas, a second positional input indicating a second position at which the second selected color is displayed. At a process block 714, the process 700 also generates a mixed color based on first selected color and the second selected color if the first position overlaps the second position. Further, at a process block 716, the process 700 sends the mixed color from the touch-enabled device to a computing device through a network.

Any of the configurations provided herein may allow the user to adjust saturation of the first selected color based on a saturation input. Further, a variety of touch gestures may be utilized to perform certain functionality on the first device 102 if the first device 102 is a touch enabled device. As an example, a tap may correspond to a new command and a double tap may correspond to a palette detail command. Further, an auto-save feature may be utilized so that a palette is saved after a certain amount of time. Alternatively, the auto-save feature may be utilized to save the palette based on a user's switch to another gallery, view, or the like. The auto-save feature may be utilized as a sub-combination or combination of these various factors. As a result, a user does not need to perform a save command. Accordingly, artists may focus on the creative process rather than being interrupted by having to perform continuous save commands.

Figure 8:
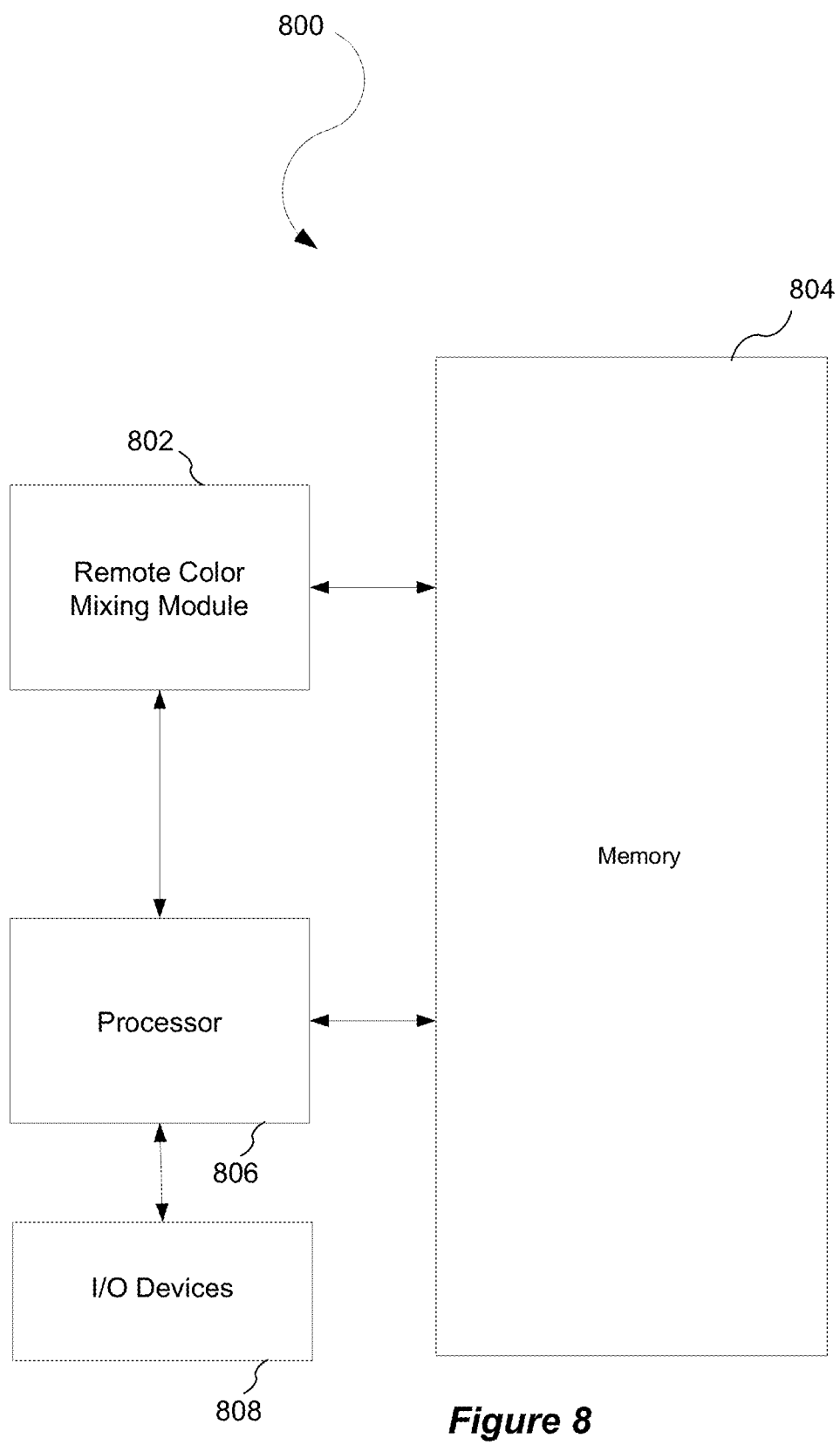
FIG. 8 illustrates a system configuration that may be utilized for remote color mixing.

FIG. 8 illustrates a system configuration 800 that may be utilized for remote color mixing. In one embodiment, a remote color mixing module interacts with a memory 804. In one embodiment, the system configuration 800 is suitable for storing and/or executing program code and is implemented using a general purpose computer or any other hardware equivalents. The processor 806 is coupled, either directly or indirectly, to the memory 804 through a system bus. The memory 804 can include local memory employed during actual execution of the program code, bulk storage, and/or cache memories which provide temporary storage of at least some program code in order to reduce the number of times code must be retrieved from bulk storage during execution.

The Input/Output ("I/O") devices 808 can be coupled directly to the system configuration 800 or through intervening input/output controllers. Further, the I/O devices 808 may include a keyboard, a keypad, a mouse, a microphone for capturing speech commands, a pointing device, and other user input devices that will be recognized by one of ordinary skill in the art. Further, the I/O devices 808 may include output devices such as a printer, display screen, or the like. Further, the I/O devices 808 may include a receiver, transmitter, speaker, display, image capture sensor, biometric sensor, etc. In addition, the I/O devices 508 may include storage devices such as a tape drive, floppy drive, hard disk drive, compact disk ("CD") drive, etc. Any of the modules described herein may be single monolithic modules or modules with functionality distributed in a cloud computing infrastructure utilizing parallel and/or pipeline processing.

Network adapters may also be coupled to the system configuration 800 to enable the system configuration 800 to become coupled to other systems, remote printers, or storage devices through intervening private or public networks. Modems, cable modems, and Ethernet cards are just a few of the currently available types of network adapters.

The processes described herein may be implemented in a general, multi-purpose or single purpose processor. Such a processor will execute instructions, either at the assembly, compiled or machine-level, to perform the processes. Those instructions can be written by one of ordinary skill in the art following the description of the figures corresponding to the processes and stored or transmitted on a computer readable medium. The instructions may also be created using source code or any other known computer-aided design tool. A computer readable medium may be any medium capable of carrying those instructions and include a CD-ROM, DVD, magnetic or other optical disc, tape, silicon memory (e.g., removable, non-removable, volatile or non-volatile), packetized or non-packetized data through wireline or wireless transmissions locally or remotely through a network. A computer is herein intended to include any device that has a general, multi-purpose or single purpose processor as described above.

It should be understood that the processes and systems described herein can take the form of entirely hardware embodiments, entirely software embodiments, or embodiments containing both hardware and software elements. If software is utilized to implement the method or system, the software can include but is not limited to firmware, resident software, microcode, etc.

It is understood that the processes and systems described herein may also be applied in other types of processes and systems. Those skilled in the art will appreciate that the various adaptations and modifications of the embodiments of the processes and systems described herein may be configured without departing from the scope and spirit of the present processes, systems, and computer program products. Therefore, it is to be understood that, within the scope of the appended claims, the present processes, systems, and computer program products may be practiced other than as specifically described herein.

We claim:

1. A computer-readable storage device comprising instructions stored thereon that, responsive to execution by a processor, perform operations comprising:
    displaying, at a graphical user interface of a touch-enabled device, a virtual canvas;
    displaying, at the graphical user interface, a plurality of color indicia;
    displaying, at the graphical user interface, a plurality of color storage areas;
    receiving a first input selecting a first selected color from the plurality of color indicia;
    receiving, at the virtual canvas, a first positional input indicating a first position to display the first selected color;
    displaying, on the graphical user interface, an indication corresponding to an amount of the first selected color remaining from the first input of the first selected color, the first positional input decreasing the amount of the first selected color remaining from the first input of the first selected color;
    receiving a second input selecting a second selected color from the plurality of color indicia;
    receiving, at the virtual canvas, a second positional input indicating a second position to display the second selected color;
    displaying, on the graphical user interface, an additional indication corresponding to an amount of the second selected color remaining from the second input of the second selected color, the second positional input decreasing the amount of the second selected color remaining from the second input of the second selected color; and
    generating a mixed color based on the first selected color and the second selected color if the first position overlaps the second position.

2. The computer-readable storage device of claim 1, wherein the instructions, responsive to execution by the processor, perform operations further comprising sending the mixed color from the touch enabled device to a computing device through a network, wherein the computing device operates a graphics program that utilizes the mixed color.

3. The computer-readable storage device of claim 1, wherein the first input is a touch input.

4. The computer-readable storage device of claim 1, wherein the second input is a touch input.

5. The computer-readable storage device of claim 1, wherein the instructions, responsive to execution by the processor, perform operations further comprising adjusting saturation of the first selected color based on a saturation input.

6. The computer-readable storage device of claim 1, wherein the instructions, responsive to execution by the processor, perform operations further comprising storing the mixed color in a touch-enabled device palette library.

7. The computer-readable storage device of claim 6, wherein the instructions, responsive to execution by the processor, perform operations further comprising sending the touch-enabled device palette library to a computing device through a network to update a computing device palette library.

8. The computer-readable storage device of claim 1, wherein the plurality of color indicia is positioned externally to the virtual canvas.

9. The computer-readable storage device of claim 1, wherein the plurality of color indicia is positioned within the virtual canvas.

10. A method comprising:
    displaying, at a graphical user interface of a touch-enabled device, a virtual canvas;
    displaying, at the graphical user interface, a plurality of color indicia;
    displaying, at the graphical user interface, a plurality of color storage areas;
    receiving a first input selecting a first selected color from the plurality of color indicia;
    receiving, at the virtual canvas, a first positional input indicating a first position to display the first selected color, the first positional input lessening an amount of the first selected color remaining from the first input of the first selected color;
    receiving a second input selecting a second selected color from the plurality of color indicia;
    receiving, at the virtual canvas, a second positional input indicating a second position to display the second selected color, the second positional input lessening an amount of the second selected color remaining from the second input of the second selected color; and
    generating a mixed color based on the first selected color and the second selected color if the first position overlaps the second position.

11. The method of claim 10, further comprising sending the mixed color from the touch enabled device to a computing device through a network, wherein the computing device operates a graphics program that utilizes the mixed color.

12. The method of claim 10, wherein the first input is a touch input.

13. The method of claim 10, wherein the second input is a touch input.

14. The method of claim 10, further comprising adjusting saturation of the first selected color based on a saturation input.

15. The method of claim 10, further comprising storing the mixed color in a touch-enabled device palette library.

16. The method of claim 15, further comprising sending the touch-enabled device palette library to a computing device through a network to update a computing device palette library.

17. A system comprising:
    a graphical user interface of a touch-enabled device, the graphical user interface configured to display a virtual canvas, a plurality of color indicia, and a plurality of color storage areas;
    a reception module configured to receive (i) a first input selecting a first selected color from the plurality of color indicia, (ii) a first positional input at the virtual canvas indicating a first position to display the first selected color, the first positional input lessening an amount of the first selected color remaining from the first input of the first selected color;

(iii) a second input selecting a second selected color from the plurality of color indicia, (iv) a second positional input at the virtual canvas indicating a second position to display the second selected color, the second positional input lessening an amount of the second selected color remaining from the second input of the second selected color;

a processor configured to:
generate a mixed color based on the first selected color and the second selected color if the first position overlaps the second position.

18. The system of claim 17, further comprising a transmission module configured to send the mixed color from the touch-enabled device to a computing device through a network, wherein the computing device operates a graphics program that utilizes the mixed color.

19. The system of claim 17, wherein the first input is a touch input.

20. The system of claim 17, wherein the second input is a touch input.

* * * * *